(12) United States Patent
Simmons

(10) Patent No.: US 8,484,890 B2
(45) Date of Patent: *Jul. 16, 2013

(54) APPARATUS FOR AEROPONICALLY GROWING AND DEVELOPING PLANTS

(75) Inventor: Robert Scott Simmons, Indiantown, FL (US)

(73) Assignee: Airgrown IP, Inc., Indiantown, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,921

(22) Filed: Jul. 16, 2012

(65) Prior Publication Data

US 2012/0279126 A1 Nov. 8, 2012

Related U.S. Application Data

(63) Continuation-in-part of application No. 12/846,467, filed on Jul. 29, 2010, now Pat. No. 8,250,809, which is a continuation-in-part of application No. 12/584,773, filed on Sep. 11, 2009, now Pat. No. 8,225,549.

(51) Int. Cl.
*A01G 31/00* (2006.01)

(52) U.S. Cl.
USPC .................................................. 47/62 A

(58) Field of Classification Search
USPC .................................................. 47/62 N
See application file for complete search history.

(56) References Cited

U.S. PATENT DOCUMENTS 8,225,549 B2 * 7/2012 Simmons .................. 47/62 N
8,250,809 B2 * 8/2012 Simmons .................. 47/62 N

* cited by examiner

*Primary Examiner* — Frank T Palo
(74) *Attorney, Agent, or Firm* — Steven M. Greenberg, Esq.; Carey, Rodriguez, Greenberg & O'Keefe

(57) ABSTRACT

An aeroponic growing system is provided. The aeroponic growing system can include a distribution pipe, multiple, different sprayers, and a plurality of plant supports. Each plant support can include a body. Each body can include an upper panel, a lower panel, and at least one opening adapted to retain a seed container formed on the upper panel. Each plant support can further comprise a liquid nutrient solution guide in fluid communication with the interior of body and extending from the lower panel of the body.

20 Claims, 9 Drawing Sheets

APPARATUS FOR AEROPONICALLY GROWING AND DEVELOPING PLANTS

CROSS-REFERENCE TO RELATED APPLICATIONS

This application is a Continuation-in-Part of U.S. application Ser. No. 12/846,467, filed Jul. 29, 2010, now U.S. Pat. No. 8,250,809, which is a Continuation-in-Part of U.S. application Ser. No. 12/584,773, filed Sep. 11, 2009, now U.S. Pat. No. 8,225,549, which are both incorporated herein by reference in their entirety.

BACKGROUND OF THE INVENTION

1. Field of the Invention

The present invention relates to aeroponics and, more particularly, growing plants in a gaseous environment.

2. Description of the Related Art

Prior to the expansion of aeroponic devices for the growth and development of plants, people experimented with hydroponics, which is a method of growing plants using mineral nutrient solutions instead of soil. Hydroponics is said to provide healthier plants that grow faster than those grown in soil. Although hydroponic plants are grown in the absence of soil, the roots are maintained in a liquid environment. Consequently, there is a lack of adequate ventilation at the roots from the continuous presence of water, which is the leading major cause of root disease.

In an attempt to avoid root disease, botanists prefer aeroponics. Aeroponics is the process of growing plants in an air or mist environment without the use of soil or an aggregate medium. Aeroponic growth has allowed growers to avoid plant-based diseases, such as *Fusarium, Botrytis, Sclerotium, Verticillium*, and *Rhizoctonia*, common in plants cultivated in soil and through hydroponics.

BRIEF SUMMARY OF THE INVENTION

Embodiments of the present invention address deficiencies of the art in respect to aeroponic growing and provide a novel and non-obvious system and apparatus for aeroponic growing. In an embodiment of the invention, an aeroponic growing system can be provided, which can include a distribution pipe coupled to a plurality of sprayers, and a plurality of plant supports. Each plant support can include a body. The body can include an upper panel, a lower panel, at least one opening adapted to retain a seed container formed on the upper panel, and at least one different opening formed on the upper panel adapted to receive a sprayer of the plurality of sprayers. Each plant support can further comprise a liquid nutrient solution guide in fluid communication with the interior of body and extending from the lower panel of the body.

Another embodiment of the invention provides for an aeroponic growing tower. An aeroponic growing tower can include a first plant support having a first body. The first body can include an upper panel, a lower panel, and at least one opening adapted to retain a seed container being formed in the upper panel. The first plant support can further include a conical wall extending from the upper panel of the first body away from the first body and in fluid connection with an interior of the first body and a liquid nutrient solution guide in fluid communication with the interior of the first body and extending from the lower panel of the first body. The aeroponic growing tower can further include a second plant support coupled to the first plant support. The second plant support can have a second body. The second body can include an upper panel, a lower panel, and at least one opening adapted to retain a seed container being formed in the upper panel of the second body. The second plant support can further include a conical wall extending away from the upper panel of the second body. The conical wall can be in fluid communication with an interior of the second body and a second liquid nutrient solution guide can be in fluid communication with the second body and extending from the lower panel of the second body, wherein the first liquid nutrient solution guide can be disposed within the conical wall of the second body.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred; it is understood, however, that the invention is not limited to the precise arrangements and instrumentalities shown, wherein.

DETAILED DESCRIPTION OF THE INVENTION

Embodiments of the invention provide for aeroponic growing. An aeroponic growing system can include a distribution pipe attached to a liquid nutrient solution delivery assembly that can be connected to multiple nested plant supports, which are each capable of holding several plants. Each plant support includes an angled upper panel with several holes as well as a first conical wall that extends up and away from an edge of the upper panel and a second conical wall, also referred to as a "liquid nutrient solution guide" that extends downward from an edge of a lower panel. Of import, the liquid nutrient solution guide provides a path for any excess liquid nutrient to flow with limited contact with the upper panel, thus preventing excess liquid nutrient from pooling at and around the holes on the upper panel, which can be detrimental to any plants growing in the aeroponic growing system as well as to the system itself.

Figure 1A:
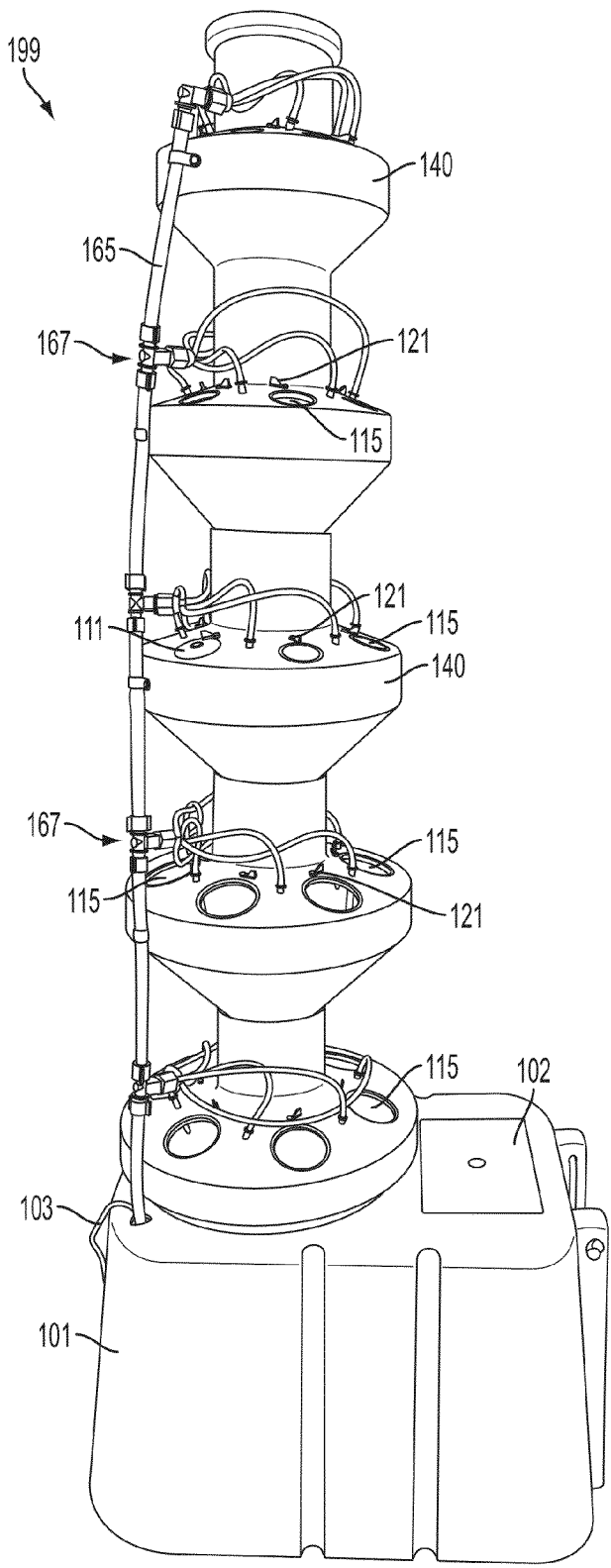
FIG. 1A is a side view of an embodiment of an aeroponic growing system.
Figure 1B:
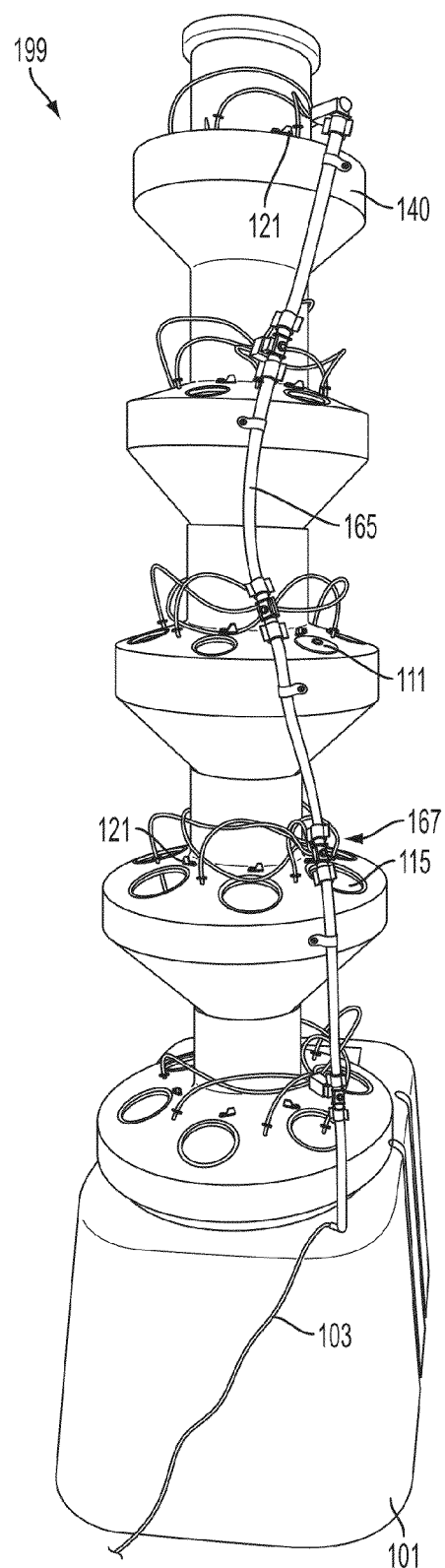
FIG. 1B is an end view of an embodiment of an aeroponic growing system.
Figure 1C:
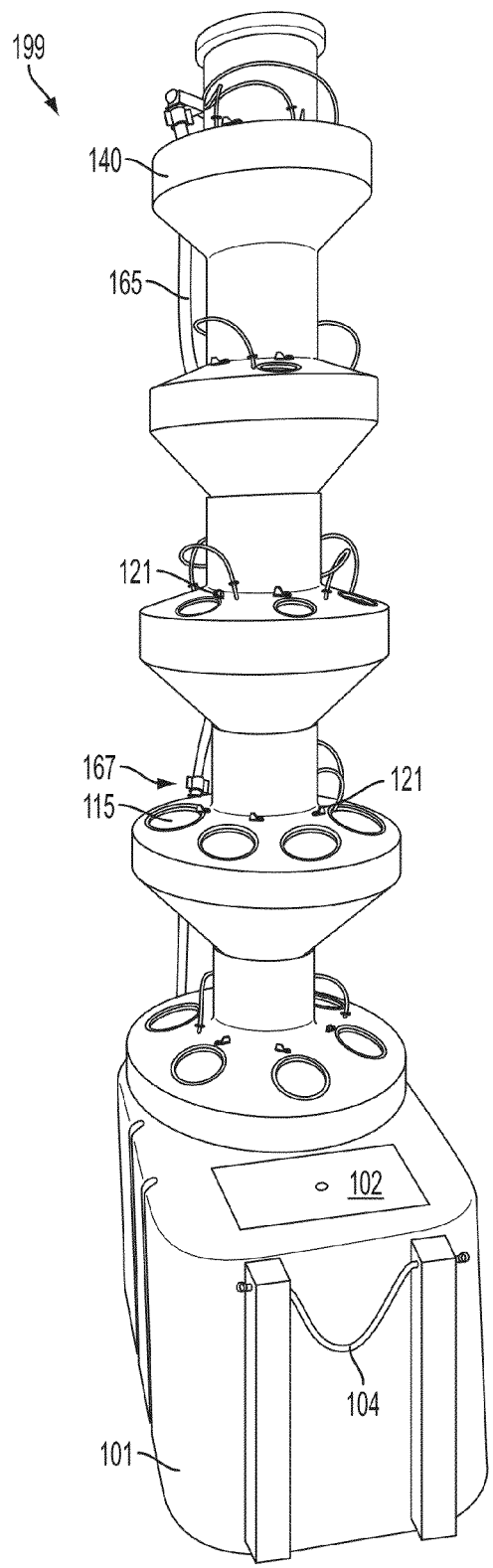
FIG. 1C is an end view of an embodiment of an aeroponic growing system.

In further illustration, FIG. 1A-1C show different views of an embodiment of an aeroponic growing system 199 providing liquid nutrient solution delivery. The aeroponic growing system 199 can be made of any material, including but not limited to plastic and metal. The system 199 can include a distribution pipe 165 coupled to multiple, different plant supports 140. In one instance, the distribution pipe 165 is coupled to an outer surface of each plant support 140 with a bracket and fasteners, which can include, but are not limited to, screws, pins, and bolts. In another embodiment, the distribution pipe 165 can be coupled to the inside of multiple, different plant supports 140, thus running downward though the hollow interior of each plant support 140. In this embodiment, the distribution pipe 165 can include multiple, different openings, where each opening can be configured for a sprayer or other device capable of delivering liquid nutrient solution to the root mass or plants in the seed containers. Of note, typically, there is a one-to-one ratio of openings in the distribution pipe 165 adapted for sprayers to the number of openings 115 adapted to receive a seed container; therefore, each plant in each seed container has a sprayer providing liquid nutrient solution directly to it.

Coupled to the distribution pipe 165 can be a liquid nutrient solution delivery assembly 167. The assembly 167 can include multiple different sprayers. Of note, a plant support 140 can be adapted to receive each sprayer through an opening on an upper panel of the plant support 140. In addition to openings adapted for a sprayer, the upper panel of a plant support 140 can include openings 115 configured to receive a seed container. Covers 111, made of any material, such as plastic, can cover the seed containers and the opening 115 can be adapted to fit the seed containers. Further, a locking device 121 can be pivotably mounted to the upper panel.

In one aspect of the embodiment illustrated herein, the locking device 121 can include anchors formed as bars pivotably mounted to the upper panel. The locking device 121 can move in multiple directions between a first position extending across opening 115 to hold the seed container in place and a second position away from opening 115. In another embodiment, anchors may be provided in tandem, i.e. on opposite sides of an opening 115. Other locking devices besides an anchor or bars can be used, including but not limited to wing nuts, sliding covers, or any other structure capable of rotating between a position at least partially covering opening 115 and a second position away from opening 115.

In an embodiment, an aeroponic growing system 199 can include multiple, different plant supports 140. In one aspect of this embodiment, the top end of a first one of the plant supports 140 can be atmospherically sealed and the bottom end of a last one of the plant supports 140 can be coupled to a base 101. In this regard, the plant supports 140 can be stacked upon one another to form a growing tower or conical tower. In the case of a conical tower, the plant supports 140 toward the top end of a growing tower can be smaller in diameter than the plant supports 140 at the bottom end or base 101 of the growing tower. Further, a plant support 140 can act as a drain for liquid nutrient solution, which is not absorbed by the root mass/plants in seed containers 100. The excess liquid nutrient solution can travel through each plant support 140 eventually reaching a base 101 where it can be directed to a reservoir where it can be re-circulated.

Of further note, the base 101 can house a reservoir, a pump, a timer, and a power supply. The timer can control the pump, which can be used to provide delivery of liquid nutrient solution via a liquid nutrient solution delivery system to the root mass/plants in a seed container 100. In an embodiment, the timer can be set to provide liquid nutrient solution to the root mass/plants in the seed containers 100 for one minute and then shut off for five minutes. The base 101 can further house a temperature conditioning element and a filter as well as any additional component which enables liquid nutrient solution to be delivered via the distribution pipe 165 to each sprayer, and thus, to the plants contained in the seed containers.

The temperature conditioning element can be separate and apart from a reservoir, such as a chiller or a heater, coupled to a power supply, or can be located within the reservoir, such as an ice pack. Of note, the reservoir can collect unabsorbed liquid nutrient solution or, if unabsorbed liquid nutrient solution is collected elsewhere in the base, the unabsorbed liquid nutrient solution can be returned to the reservoir for reuse. Of further note, the base can also include a base cover 102 as well as a handle 104, such as a rope handle, and wheels.

Figure 2A:
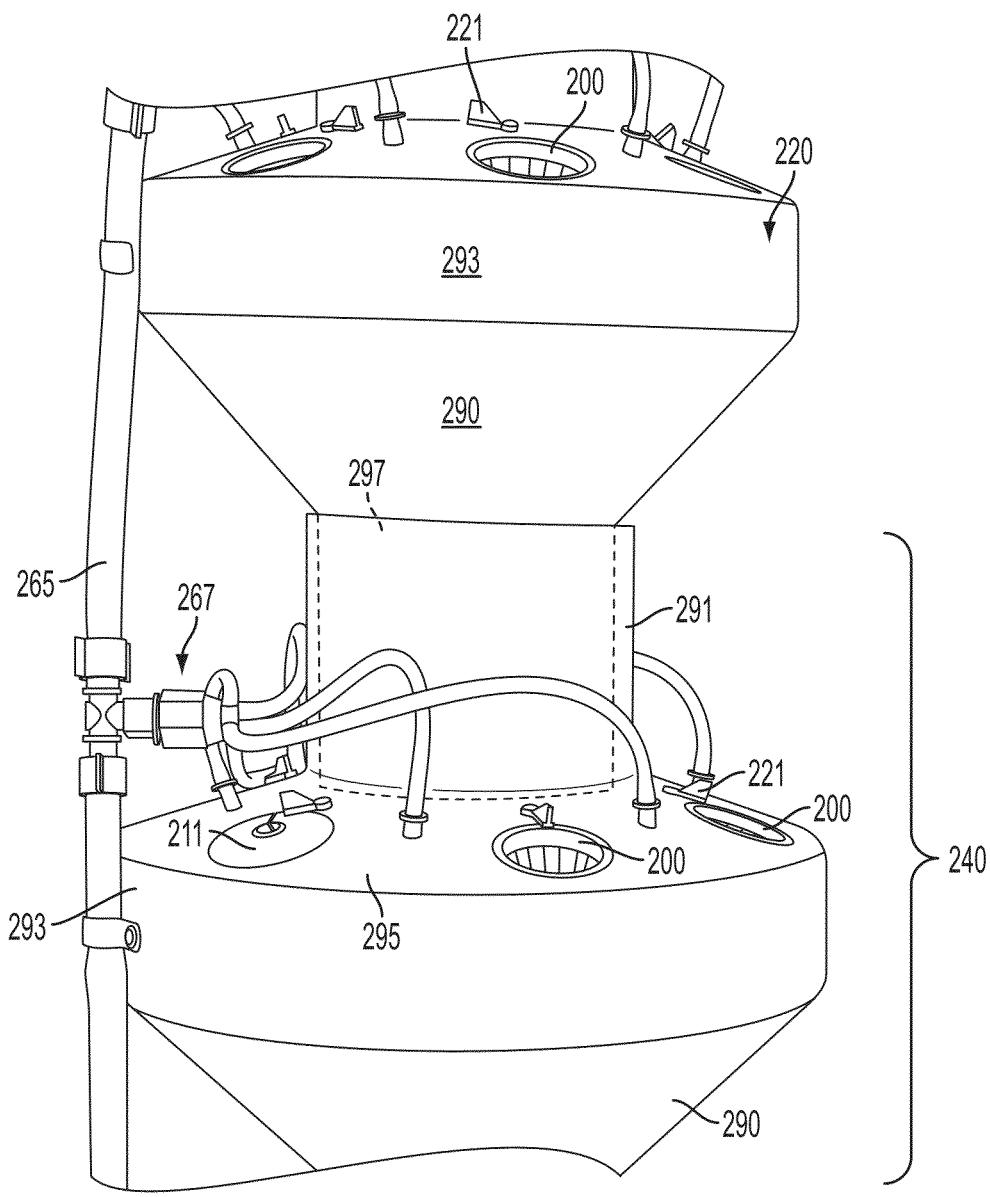
FIG. 2A is a sectional view of an embodiment of different plant supports coupled to multiple, different sprayers in accordance with an embodiment of the invention.
Figure 2B:
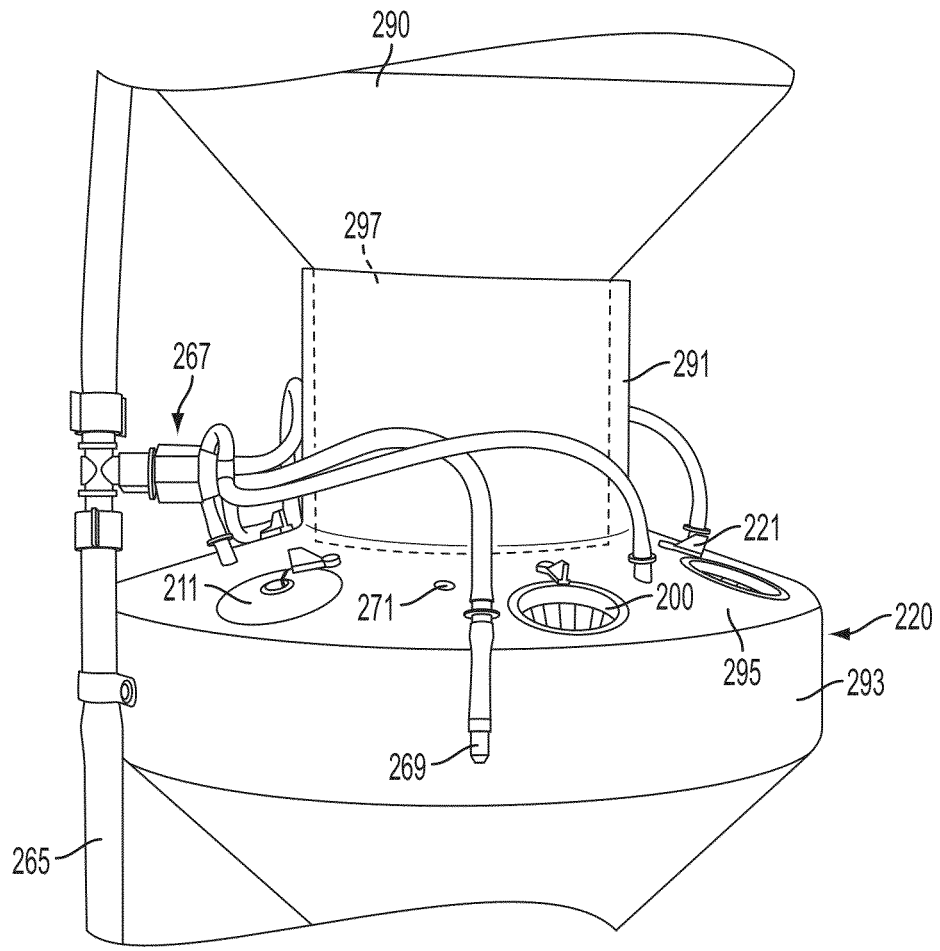
FIG. 2B is a sectional view of an embodiment of different plant supports coupled to multiple, different sprayers in accordance with an embodiment of the invention.

In further illustration, FIGS. 2A, and 2B are sectional views of an embodiment of nested plant supports 240 coupled to a liquid nutrient solution delivery assembly 267. FIGS. 2A and 2B further illustrate embodiments with the distribution pipe 265 positioned on an outside surface of a plant support 240. A plant support 240 can include a body 220 with an upper panel 295, which can slope outward (substantially away from a center vertical axis of a plant support 240) and downward (towards the bottom end of an aeroponic growing system). Of note, the upper panel 295 can be a planer surface. The body 220 can be of any shape which can accommodate a seed container 200, and facilitate the feeding and draining of liquid nutrient solution, and need not be limited to a disk-like or a triangular-like shape. In addition, the body 220 can have a partially hollow interior. Also, the upper panel 295 is not parallel to the ground. In one embodiment, the upper panel 295 can slope at least twelve degrees measured from a horizontal axis of a plant support 240. Of note, the sloping nature of the upper panel 295 can assist in allowing more light to reach the plants in the seed containers 200. The upper panel 295 can further include at least one opening adapted to retain a seed container 200 as well as a locking device 221 pivotably mounted on the upper panel 295. In one embodiment, the number of locking devices 221 can correspond to the number of seed containers 200. In this way, the seed container 200 and/or cover 211 can be retained in place by the locking mechanism 221. Each locking device 221 can be pivotably mounted to the body 220 of a plant support 240 adjacent to at least one opening adapted to retain a seed container 200 begin formed in the upper panel 295. Each locking device 221 can be movable between a first position, where the locking device 221 extends across the opening, and a second position, where the locking device 221 does not extend across the opening. The openings for the seed containers 200 can be at circumferentially spaced points on the upper panel 295. In addition, the upper panel 295 can include at least one opening adapted to receive a sprayer 269.

The body 220 of a plant support 240 can further include a lower panel 290 coupled to the upper panel 295. The lower panel 290 can slope inward (substantially toward a center vertical axis of a plant support 240) and downward from the upper panel 295. Of note, the sloping nature of the lower panel 290 can assist in allowing more light to reach the plants in the seed containers 200 by limiting the amount of shade created by the plant support 240. In an embodiment of a plant support 240, the body 220 can further include a sidewall 293, which can extend substantially downward (in the direction of the bottom end of an aeroponic growing system) and can be positioned between an edge (a bottom edge) of the upper panel 295 and an edge (a top edge) of the lower panel 290. Further, the sidewall 293, like the upper panel 295 and the lower panel 290, can run circumferentially around a vertical center axis of a plant support 240.

A conical wall 291 can further be coupled to a body 220 of a plant support 240. The conical wall 291 can extend substantially upward and away from the upper panel 295. A second conical wall, also referred to as a "liquid nutrient solution guide," 297 can extend from the lower panel 290. The liquid nutrient solution guide 297 can form a path for excess liquid nutrient solution to travel. In this way, the excess unabsorbed liquid nutrient solution does not pool at any recess, such as the openings 215 adapted to receive seed containers 200, and flows to the base of an aeroponic growing system, where the liquid nutrient solution can be collected and re-circulated. In an embodiment, the liquid nutrient solution guide 297 can have a length greater than the length of the conical wall 291. The liquid nutrient solution guide 297 can extend into the interior of the adjacent lower plant support 240 in order to provide a path for unabsorbed liquid nutrient solution, so the solution does not come in contact with the upper panel 295 and therefore does not travel along the interior surface of a plant support 240. In addition, the conical wall 291 has an outer diameter that is smaller than the inner diameter of the liquid nutrient solution guide 297. In this way, the conical wall 291 can receive and support the liquid nutrient solution guide 297 of an adjacent plant support 240. In other words, a conical wall 291 of a second plant support 240 is less than a length of a liquid nutrient solution guide 297 of a first plant support, where the first second plant 240 is nested within the second plant support 240 so that there is a friction fit between the conical wall 291 of a second plant support 240 and the liquid nutrient solution guide 297 of the first plant support 240. Further, the liquid nutrient solution guide 297 can extend into the interior of the body 220 of an adjacent plant support 240.

In an embodiment, multiple plant supports 240 can be coupled to each other to form an aeroponic growing tower. The aeroponic growing tower can include a first plant support 240 having a first body 220 with an upper panel 295, a lower panel 290, and at least one opening adapted to retain a seed container 200 being formed in the upper panel 295. The first plant support 240 can further include a conical wall 291 extending from the upper panel 295 of the first plant support away from the first body 220 and being in fluid communication with an interior of the first body 220 and a first liquid nutrient solution guide 297 in fluid communication with the interior of the first body 220 and extending from the lower panel 290 of the first body 220. The aeroponic growing tower can further include a second plant support 240 coupled to the first plant support 240; the second plant support can include a second body 220. The second body 220 can have an upper panel 295, a lower panel 290, and at least one opening adapted to retain a seed container 200 being formed in the upper panel 295 of the second body 220. The second plant support 240 can further include a conical wall 291, which can extend away from the upper panel 295 from the second body and can be in fluid communication with the interior of the second body 220 and a second liquid nutrient solution guide 297 in fluid communication with the second body 220 and extending from the lower panel 290 of the second body 220. The first liquid nutrient solution guide 297 is thus disposed within the conical wall 291 of the second body 220.

Of note, in an embodiment of the invention, a first plant support 240 (one located toward the top end of an aeroponic growing tower or in an aeroponic growing system) can have a smaller diameter than a second, adjacent (lower-positioned) plant support. The next lower (adjacent) plant support 240 can have a diameter larger than the diameter of the plant support 240 above it and so on, so that the lowest positioned plant support 240 has the largest diameter. In other words, a first plant support 240 can have a diameter and a second plant support 240, where the second plant support 240 is positioned below the first plant support 240, can have a second diameter, where the second diameter is greater than the first diameter. In this way, the variation in the diameters of the plant supports 240 assist in preventing the upper plant supports 240 from blocking the light to the lower plant supports 240. In addition, the sloping nature of the upper panel 295 and the lower panel 290 of each plant support 240 further enables light to reach the plants in the seed containers 200, thus limiting light being blocked from plant supports 240 stacked above. In another embodiment, a lower positioned plant support 240 can have a diameter equal to or greater than a diameter of a plant support 240 positioned above the lower positioned plant support 240.

Figure 2C:
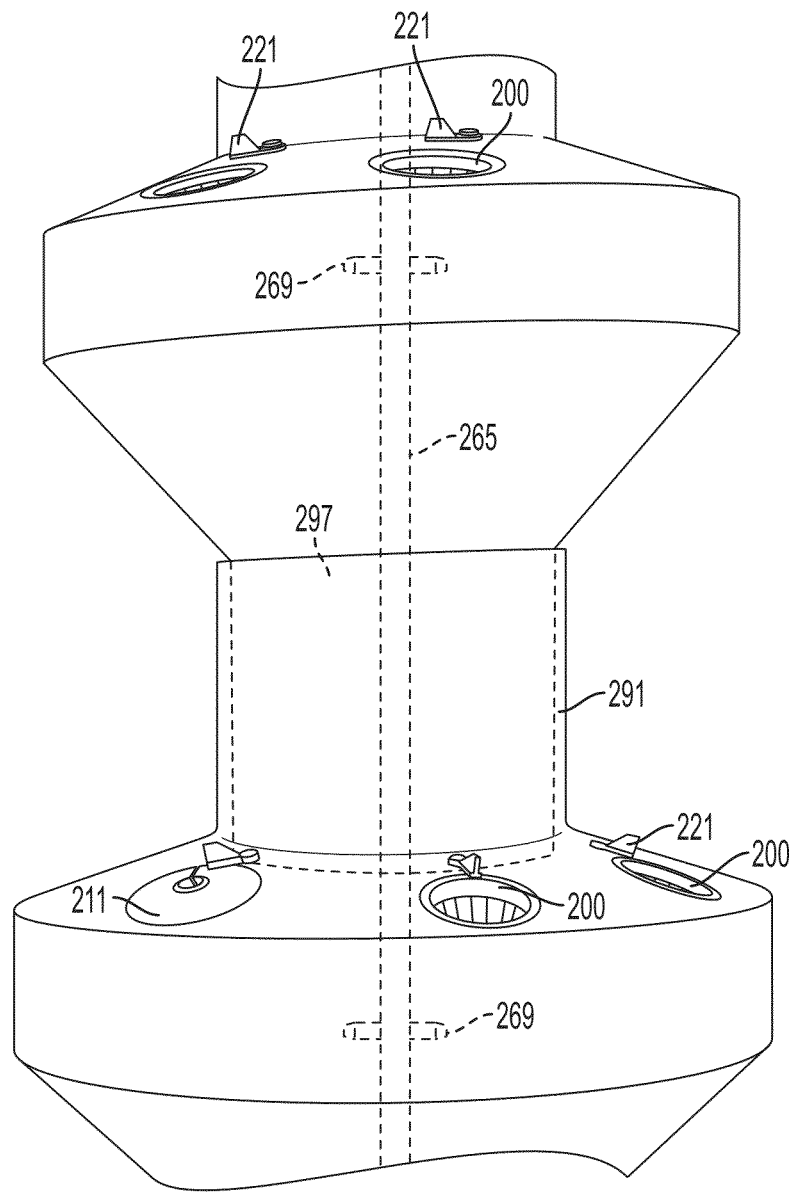
FIG. 2C is a sectional view of an embodiment of different plant supports coupled to multiple, different sprayers in accordance with an embodiment of the invention.

Liquid nutrient solution can be delivered to the plants in the seed containers 200 via a liquid nutrient solution delivery assembly 267 as shown in FIGS. 2A and 2B. In an embodiment, a distribution pipe 265 can be position vertically and coupled to a sidewall 293 of at least one body 220 of at least one plant support 240. In other words, the distribution pipe 265 can be attached to an outer surface of multiple, different plant supports 240, as shown in FIGS. 2A and 2B. In another embodiment, as illustrated in FIG. 2C, the distribution pipe 165 can be coupled to an internal surface of multiple, different plant supports, thus running downward though the hollow interior of each plant support. In this embodiment, the distribution pipe 265 can include multiple, different openings, where each opening can be configured for a sprayer 269 or other device capable of delivering liquid nutrient solution to the root mass or plants in the seed containers.

The distribution pipe 265 can be of varying lengths and diameters. In one embodiment, the distribution pipe 265 can be at least equal to the height of a growing tower. The diameter of the distribution pipe 265 can be one inch, in one embodiment, and three inches in another embodiment. The distribution pipe 265 can further include additional length that runs into the base of an aeroponic growing system through an aperture on a top surface of the base.

Coupled to the distribution pipe 265 can be a liquid nutrient delivery assembly 267. The assembly can include multiple, different sprayers 269. Each sprayer 269 can include a tip end, which can be adapted to fit in an aperture 271 in the upper panel 295 of the body 220 of a plant support 240. A sprayer 269 can spray, fog, and/or mist liquid nutrient solution onto the roots and/or plants in a seed container 200. Of note, there can be multiple apertures 271 in the upper panel 295, which allow for multiple sprayers 269. Each aperture 271 can be positioned approximately halfway between two adjacent openings, each opening configured to receive a seed container 200. In this way, if a sprayer 269 is non-functional, an adjacent sprayer 269 can still provide nutrients to a plant in the seed container 200. Of note, if an embodiment of the invention includes the distribution pipe 265 coupled to at least one interior surface of multiple, different plant supports 240, then the upper panel 295 can but does not have to have apertures 271 adapted to receive the tip end of a sprayer 269. Instead, the distribution pipe 265 can include multiple different openings with each opening adapted to receive a sprayer 269, so that the distribution pipe 265 and each sprayer 269 remain internal to each plant support 240. Of further note, a cover 211 can be disposed atop each seed container 200. Further, a locking device 221 can secure the seed container 200 and/or the cover 211 in place. As gravity can cause the leaves and branches which extend from opening 215 to dislodge the plant, the locking device 221 can also serve to keep plants securely in place.

Figure 3:
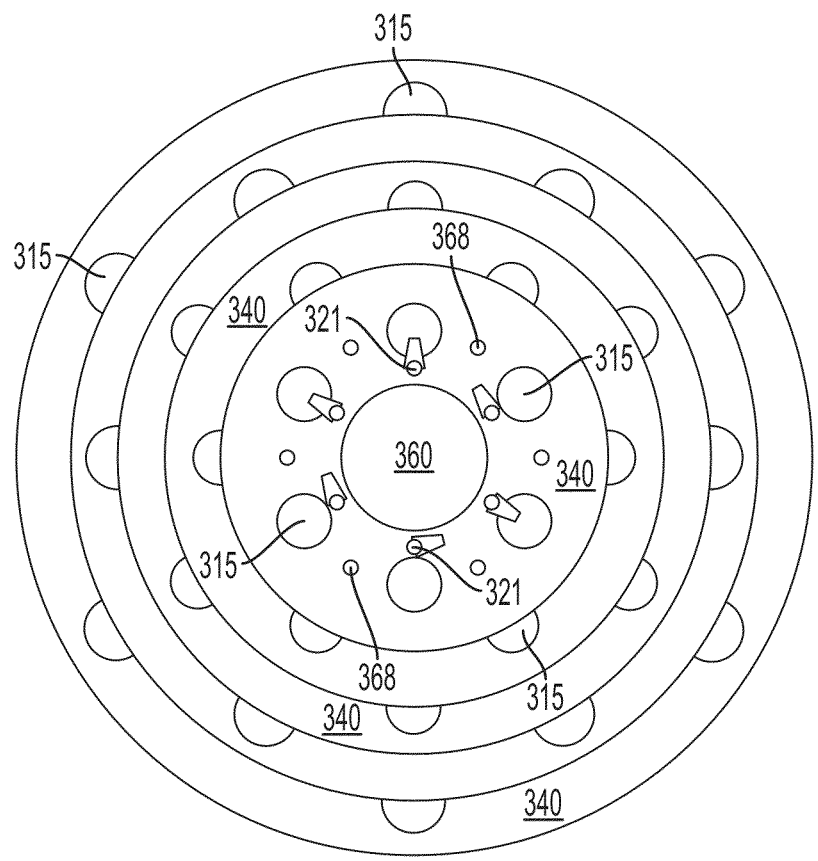
FIG. 3 is a plan view of an embodiment of plant supports.

In further illustration, FIG. 3 is a plan view of an embodiment of plant supports 340 showing that a plurality of openings 315, each adapted to receive a seed container, are offset relative to the positioning of openings of an adjacent plant support 340. In one embodiment, there can be five plant supports 340. Adjacent plant supports 340 can be rotated a predetermined number of degrees around a center axis (center vertical axis) of the nested plant supports 340. In this way, the plants growing in a plant support 340 will limit the interference with a plant growing in an opening 315 directly beneath. In one embodiment, there can be six openings 315, each adapted to receive a seed container, on the upper panel of each plant support 340. In other embodiments, there can be a variety of openings 315. In addition, FIG. 3 illustrates a multiple of apertures 368 adapted to receive the tip end of a sprayer as well as multiple locking devices 321, for instance six locking devices 321. Each locking device 321 can correspond to an opening 315. There can be a variety of apertures 368 adapted to receive the tip end of a sprayer: in one embodiment, there are six such apertures 368.

Figure 4A:
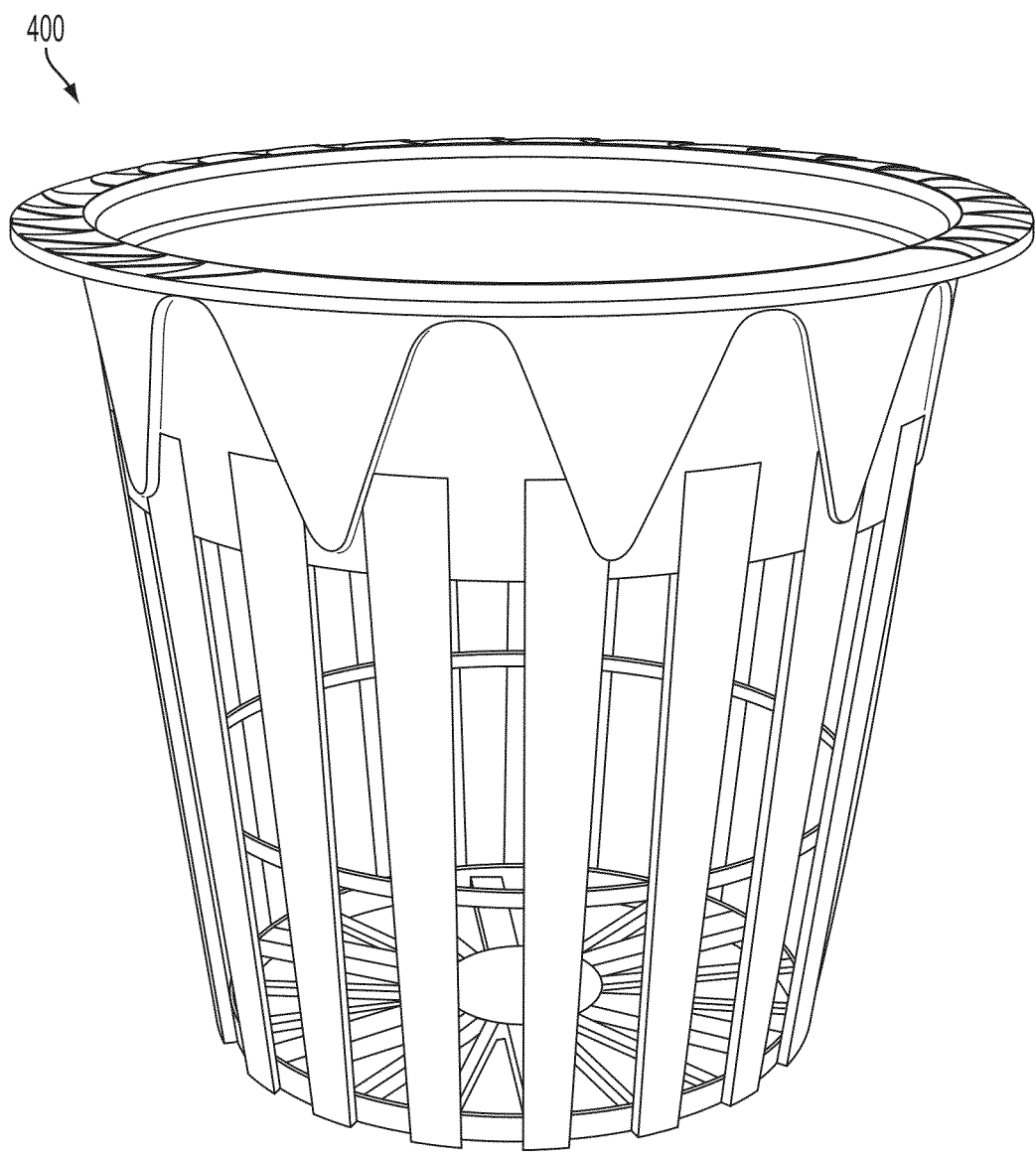
FIG. 4A is an embodiment of a seed container.
Figure 4B:
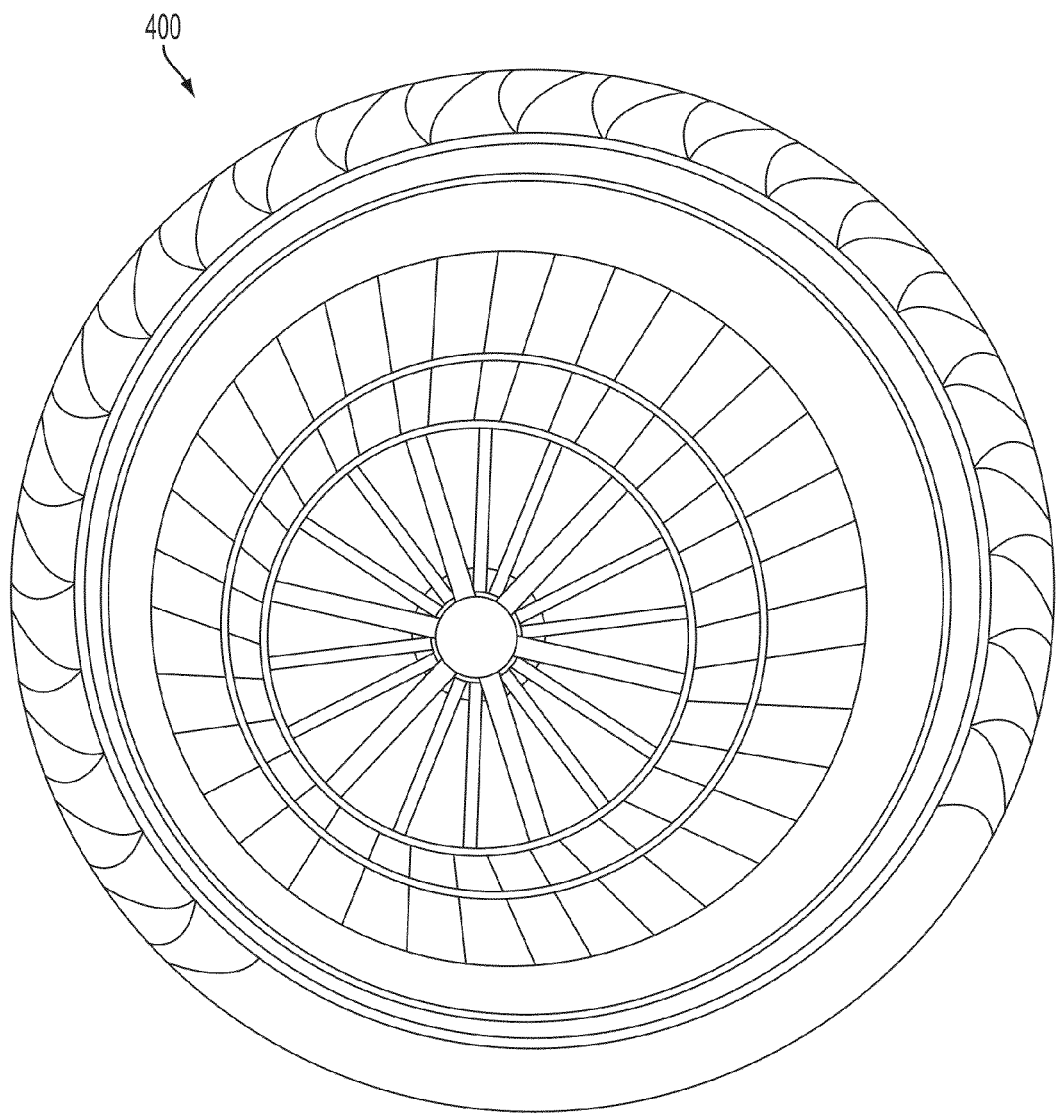
FIG. 4B is a top view of an embodiment of a seed container.

In further illustration, FIGS. 4A and 4B show an embodiment of a seed container 400. The seed container 400 can support a plant, seed, or starter media and can comprise holes, mesh, or the like, which maintains the plant, seed, or starter media. In one embodiment, the seed container can be made of any material, including but not limited to plastic.

Of note, the aeroponic growing system, in an embodiment, can be a self-contained, single unit. In another embodiment, multiple plant supports can stacked to form a single growing tower, or multiple single growing towers can be coupled to form a system of aeroponic growing towers. Further, self-contained, single units can be coupled together to create larger systems.

Having thus described the invention of the present application in detail and by reference to embodiments thereof, it will be apparent that modifications and variations are possible without departing from the scope of the invention defined in the appended claims as follows:

1. An aeroponic growing system comprising:
a distribution pipe;
a plurality of sprayers coupled to the distribution pipe; and,
a plurality of plant supports, each plant support with a body with an upper panel, a lower panel, and at least one first opening adapted to retain a seed container formed on the upper panel, each plant support further comprising a liquid nutrient solution guide in fluid communication with the interior of the body and extending from the lower panel of the body.

2. The aeroponic growing system of claim 1, wherein the upper panel further comprises at least one second opening adapted to receive a sprayer of the plurality of sprayers.

3. The aeroponic growing system of claim 2, wherein the at least one second opening adapted to receive the sprayer is positioned approximately halfway between the first opening adapted to retain the seed container and a different first opening adapted to retain a different seed container.

4. The aeroponic growing system of claim 1, wherein each sprayer of the plurality of sprayers comprises a tip, wherein the second opening is adapted to receive the tip.

5. The aeroponic growing system of claim 1, further comprising a second plant support coupled to the plant support, wherein at least one second opening formed on an upper panel of the second plant support is adapted to receive a sprayer.

6. The aeroponic growing system of claim 1, wherein each plant support further comprises a conical wall, the conical wall extending upward and away from the upper panel.

7. The aeroponic growing system of claim 1, wherein the distribution pipe is coupled to an outer surface of each plant support.

8. The aeroponic growing system of claim 1, wherein the distribution pipe is coupled to an interior surface of at least one of the plurality of plant supports.

9. An aeroponic growing tower comprising:
a first plant support having a first body, the first body with an upper panel, a lower panel, and at least one opening adapted to retain a seed container being formed in the upper panel, the first plant support further comprising a conical wall extending away from said upper panel of said first body and being in fluid communication with an interior of the first body and a first liquid nutrient solution guide in fluid communication with the interior of the first body and extending from the lower panel of the first body; and,
a second plant support coupled to the first plant support, the second plant support with a second body, the second body having an upper panel, a lower panel, and at least one opening adapted to retain a seed container being formed in the upper panel of the second body, the second plant support further comprising a conical wall extending away from the upper panel of the second body and being in fluid communication with an interior of the second body and a second liquid nutrient solution guide in fluid communication with the second body and extending from the lower panel of the second body,
wherein the first liquid nutrient solution guide being disposed within the conical wall of the second body.

10. The apparatus of claim 9, wherein the first plant support is oriented relative to the second plant support so that the at least one opening of the first plant support is offset from the at least one opening of the second plant support.

11. The apparatus of claim 9, further comprising:
at least one first locking device pivotably mounted to the first body adjacent to at least one opening adapted to retain a seed container being formed in the upper panel, the at least one first locking device being movable between a first position where the at least one first locking device extends across the at least one opening, and a second position where the at least one locking device does not extend across the opening; and,
at least one second locking device pivotably mounted to the second body adjacent to at least one opening adapted to retain a seed container being formed in the upper panel, the at least one second locking device being movable between a first position where the at least one locking device extends across the at least one opening, and a second position where the at least one second locking device does not extend across the opening.

12. The apparatus of claim 9, wherein the first plant support has a first diameter and the second plant support has a second diameter, the second diameter being greater than the first diameter.

13. The apparatus of claim 9, wherein the first liquid nutrient solution guide is a second conical wall.

14. The apparatus of claim 9, wherein the second liquid nutrient solution guide is a second conical wall.

15. The apparatus of claim 9, wherein the conical wall of the second plant forms a friction fit with the first liquid nutrient solution guide of the first plant support.

16. The apparatus of claim 9, wherein the first body further comprises a sidewall of the first body, the sidewall positioned between an edge of the upper panel of the first body and an edge of the lower panel of the first body.

17. The apparatus of claim 9, wherein the second body further comprises a sidewall of the second body, the sidewall positioned between an edge of the upper panel of the second body and an edge of the lower panel of the second body.

18. The apparatus of claim 9, wherein the upper panel of the first body extends downward and outward from a center vertical axis of an aeroponic tower and the lower panel of the first body extends downward and inward toward the center vertical axis of the aeroponic tower and the upper panel of the second body extends downward and outward from a center vertical axis of an aeroponic tower and the lower panel of the second body extends downward and inward toward the center vertical axis of the aeroponic tower.

19. The apparatus of claim 9, wherein the length of the conical wall of the second plant support is less than a length of the first liquid nutrient solution guide of a first plant support.

20. The apparatus of claim 9, wherein the upper panel of the first body has an angle of at least twelve degrees as measured from a horizontal axis of the first plant support and the upper panel of the second body has an angle of at least twelve degrees as measured from a horizontal axis of the second plant support.

* * * * *